United States Patent [19]

Nill et al.

[11] E Re. 30,643

[45] Reissued Jun. 9, 1981

[54] METHOD OF ALUMINIZING THE INSIDE OF THE PANEL OF A TELEVISION PICTURE TUBE

[75] Inventors: Eberhard Nill, Esslingen; Peter Schmidt, Denkendorf, both of Fed. Rep. of Germany

[73] Assignee: International Standard Electric Corporation, New York, N.Y.

[21] Appl. No.: 124,005

[22] Filed: Feb. 25, 1980

Related U.S. Patent Documents

Reissue of:

[64] Patent No.: 4,022,929
Issued: May 10, 1977
Appl. No.: 620,098
Filed: Oct. 6, 1975

[30] Foreign Application Priority Data

Oct. 25, 1974 [DE] Fed. Rep. of Germany ..... 2450834

[51] Int. Cl.[3] ..... H01J 29/28; C23C 13/02

[52] U.S. Cl. ..... 427/69; 427/101; 427/123; 427/404; 427/292

[58] Field of Search ..... 427/275, 287, 309, 69, 427/292, 64, 70, 107, 123, 404

[56] References Cited

U.S. PATENT DOCUMENTS

| | | | |
|---|---|---|---|
| 2,233,786 | 3/1941 | Law | 427/69 |
| 2,751,515 | 6/1956 | Peper | 427/69 |
| 3,067,055 | 12/1962 | Saulnier | 427/69 |
| 3,317,337 | 5/1967 | Saulnier | 427/69 |
| 3,472,672 | 10/1969 | Prazak et al. | 427/68 |
| 3,582,389 | 6/1971 | Saulnier | 427/69 |
| 3,582,390 | 6/1971 | Saulnier | 427/69 |
| 3,821,009 | 6/1974 | Lerner et al. | 427/64 |
| 4,039,701 | 8/1977 | Benthem et al. | 427/69 |

FOREIGN PATENT DOCUMENTS

| | | |
|---|---|---|
| 587597 | 11/1959 | Canada . |
| 1014238 | 8/1957 | Fed. Rep. of Germany . |
| 1127499 | 4/1962 | Fed. Rep. of Germany . |
| 2247251 | 4/1973 | Fed. Rep. of Germany . |
| 1069357 | 7/1954 | France . |
| 7234818 | 5/1973 | France . |
| 1099545 | 1/1968 | United Kingdom . |

*Primary Examiner*—Ralph S. Kendall
*Attorney, Agent, or Firm*—John T. O'Halloran; Peter C. Van der Sluys

[57] ABSTRACT

The invention relates to a method of aluminizing the inside of the panel of a television picture tube. When aluminizing the inside of the panel, blisters caused by the vaporizing lacquer, are likely to develop in the layer of aluminum, especially on the side walls of the panel portion. When taking care in accordance with the invention, that the coat of lacquer is roughened prior to the performance of the aluminizing process, these blisters are avoided.

1 Claim, No Drawings

METHOD OF ALUMINIZING THE INSIDE OF THE PANEL OF A TELEVISION PICTURE TUBE

Matter enclosed in heavy brackets [ ] appears in the original patent but forms no part of this reissue specification; matter printed in italics indicates the additions made by reissue.

The present invention relates to a method of aluminizing the inside of the panel portion of a television picture tube, in the course of which a lacquer forms an intermediate layer between the layer of fluorescent material and the layer of aluminum as applied thereafter by way of evaporation.

The layer of lacquer serves above all to enable the application of homogeneous layer of aluminum to the parts of the panel covered by the layer of fluorescent material. After the aluminum has been applied by evaporation, the layer of lacquer is removed in the course of the further manufacturing process by vaporization at higher temperatures.

During application of the lacquer, however, not only the internal surface areas of the panel coated with fluorescent material are coated with the lacquer, but also the e.g. uncoated lateral surfaces.

Especially on these lateral surfaces it has been found after the vaporization of the lacquer, that the layer of aluminum contains blisters, thus causing the layer of aluminum to no longer meet the quality requirements placed thereon, especially because with most of the television receivers which are presently on the market, the picture tubes are assembled in accordance with the socalled push-through technique (for providing maximum picture area), with parts of the lateral walls of the panel being visible from the outside.

It is the object of the invention to provide a method which, when used, will serve to avoid the defects in the layer of aluminum.

According to the invention this object is achieved in that the coat of lacquer as applied onto the layer of fluorescent material, and dried, is roughened at least within the area of the lateral surfaces of the panel.

According to one example of embodiment it is proposed that boric acid is sprayed onto the coat of lacquer, and dried.

According to a further variation of the method of the invention, it is proposed that the lateral walls of the panel are roughened prior to the application of the coat of lacquer.

Further details of the invention as well as the advantages thereof may be taken from the patent claims, as well as from the following specification.

As is known, subsequently to the application of the layer of fluorescent material, the lacquer is washed or sprayed into the panel, and substantially distributed over the entire internal surface of the panel, hence also at the parts where no fluorescent material is, and where the glass surface is exposed. This is the case at the lateral wall of the panel portion.

The uncoated glass on the lateral walls has a very smooth surface on which the aluminum would also precipitate to form a homogeneous layer without the application of the coat of lacquer. It would involve a considerable investment, however if care were taken that the lacquer would only deposit within the area of the fluorescent material layer within the panel, while the involved material in the form of the unnecessary lacquer on the lateral walls does not count.

Experience has shown, however, that the lacquer especially on the free parts of the glass surface, is not only superfluouous, but even problematic.

When heating the tube during which the lacquer is removed by vaporization, it has proved that the layer of aluminum tends to form blisters especially at the points at which also the lacquer is already applied to a very smooth underground, whereas the formation of blisters has not been noticed at all or only to a small extent at the points where both the lacquer and the layer of aluminum are deposited on the comparatively rough layer of fluorescent material.

It has thereupon been tried to wipe the coat of lacquer off the glass surface prior to evaporating the aluminum onto the lateral wall of the panel. After that there was no longer noticed any tendency to form blisters.

This wiping of each individual panel, however, is very costly.

It has provided, however, that in the presence of a certain roughness of the dried lacquer surface, the aluminum was not caused to form blisters upon removal of the lacquer caused by vaporization with the aid of heat.

As one reason for this phenomenon it is assumed that the roughness of the aluminum is at many parts so thin that the lacquer to be vaporized, can easily escape at these thin parts of the layer, thus causing no formation of vapour blisters from which the vapour, e.g. upon reaching a certain overpressure, escapes by bursting the blisters.

Based on this recognition, the coat of lacquer inside the panel, and more particularly on the lateral (side) walls, is provided with a certain roughness subsequently to the drying and prior to the application of the layer of aluminum. Relative thereto, various methods or materials have proved to be suitable.

A first possibility resides in spraying boric acid upon the coat of lacquer. The salt crystals remaining after the drying, then form the desired roughness.

[A second possibility is offered by the application of ammonium-carbonate which is sprayed on in the form of an aqueous solution.]

[It has likewise proved suitable to repeat the spraying of lacquer.] In all of the aformentioned methods a washing-in may also be employed instead of the spraying.

A fundamentally quite different method for achieving a roughness, especially on the glass surfaces of the panel not covered with the fluorescent material, is seen in roughening the glass itself, e.g. by way of sand-blasting. This method will be employed as soon as it has become possible to make this method more simple and more inexpensive than the aforementioned methods.

What is claimed is:

[1. In a method of aluminizing the inside of the panel of a television picture tube wherein a lacquer forms an intermediate layer between the layer of fluorescent material and the layer of aluminum as applied thereafter by way of evaporation, the steps of applying the coat of lacquer drying said coat of lacquer and roughening said coat of lacquer onto the layer of fluorescent material, at least within the area of the lateral surfaces of the panel sufficiently to prevent the formation of blisters in the subsequently applied layer of aluminum caused by vaporization of said coat of lacquer when subsequently heated.]

[2. A method according to claim 1, wherein said roughening step is accomplished by is boric acid is sprayed onto the coat of lacquer, and dried.]

[3. A method according to claim 1, wherein said roughening step is accomplished by supplying a further coat of lacquer onto said first coat of lacquer.]

[4. The method according to claim 1, wherein said roughening step is accomplished by spraying ammonium carbonate in a aqueous solution into said coat of lacquer and thereafter drying said ammonium carbonate solution.]

[5. A method according to claim 1, wherein said roughening step is accomplished by roughening the side walls of said panel prior to the application of said coat of lacquer.]

[6. A method according to claim 5, wherein said roughening step is accomplished by sandbasting the side walls of said panel prior to the application of said coat of lacquer.]

*7. In a method of aluminizing the inside of the panel of a television picture tube wherein a lacquer forms an intermediate layer between the layer of fluorescent material and the layer of aluminum as applied thereafter by way of evaporation, the steps of applying the coat of lacquer onto the layer of fluorescent material and onto the lateral surfaces of the panel not covered by fluorescent material, drying said coat of lacquer, spraying boric acid onto said coat of lacquer and drying said boric acid, thereby roughening said coat of lacquer on the layer of fluorescent material and within the area of the lateral surfaces of the panel sufficiently to prevent the formation of blisters in the subsequently applied layer of aluminum caused by vaporization of said coat of lacquer when subsequently heated.*

* * * * *